United States Patent [19]

Ishizuka et al.

[11] Patent Number: 5,226,224
[45] Date of Patent: Jul. 13, 1993

[54] METHOD OF REMOVING SHEATH FROM ELECTRIC WIRE IN INTERMEDIATE REGION

[75] Inventors: Yasumasa Ishizuka; Etsushi Shigetomo; Takahiro Asano, all of Takarazuka, Japan

[73] Assignee: Shin Meiwa Industry Co., Ltd., Nishinomiya, Japan

[21] Appl. No.: 702,954

[22] Filed: May 20, 1991

[30] Foreign Application Priority Data

May 31, 1990 [JP] Japan .................. 2-144011
Oct. 15, 1990 [JP] Japan .................. 2-276642

[51] Int. Cl.⁵ ............................ H01R 43/00
[52] U.S. Cl. ..................... 29/825; 81/9.51; 83/947; 29/867; 29/564.4
[58] Field of Search ............. 29/867, 564.4, 426.1, 29/426.2, 426.3, 825; 81/9.51; 83/861, 879, 880, 947

[56] References Cited

U.S. PATENT DOCUMENTS 3,363,309  1/1968  Logan et al. ................. 29/867
3,748,932  7/1973  Neiman et al. ............... 81/9.51

FOREIGN PATENT DOCUMENTS 206314  8/1990  Japan ........................ 81/9.51

Primary Examiner—P. W. Echols
Attorney, Agent, or Firm—Oblon, Spivak, McClelland, Maier & Neustadt

[57] ABSTRACT

The points of second cutters (153) are disposed within a gap (E) generated by moving an electric wire (600a) longitudinally after the formation of a first slit (610), and subsequently the electric wire (600a) is moved longitudinally to form a split slit (620) for removing sheath in an intermediate region. The first slit (610) and a second slit (630) are formed at positions deviated in one direction respectively from both ends of the intermediate region (600S), and the electric wire is moved longitudinally with first cutters (103) remaining stuck in the sheath at one end thereof, so that waste strip is removed.

7 Claims, 16 Drawing Sheets

METHOD OF REMOVING SHEATH FROM ELECTRIC WIRE IN INTERMEDIATE REGION

BACKGROUND OF THE INVENTION

1. Field of the Invention

The present invention relates to a method of removing sheath from an electric wire in an intermediate region for production of harnesses and the like. More particularly, it relates to a method of forming the sheath with a split slit or longitudinal slit and a method of stripping the sheath in order to remove the sheath.

2. Description of the Prior Art

A large number of devices for stripping sheath from an electric wire in an intermediate region have been proposed in recent years. The process of sheath removal by the commonest device of this type is illustrated in FIGS. 9 to 12. The device comprises a pair of first cutters 2 (in FIG. 9) for cutting into the sheath of an electric wire 1 along the outer periphery, a pair of second cutters 3 (in FIG. 10) for forming the sheath of the wire 1 with split slits running longitudinally of the wire 1, and electric wire transfer means (not shown) for holding and transferring the wire 1 in a predetermined direction.

In a first stage of the process, the electric wire transfer means holds the wire 1 at a predetermined position. As shown in FIG. 9, the first cutters 2 cut into the sheath at one end of an intermediate strip region 1S of the wire 1 along the outer periphery to form a slit 4.

The electric wire transfer means transfers the wire 1, so that the points of the second cutters 3 are disposed to the position corresponding to one end of the intermediate strip region of the wire 1, as shown by the two-dot chain lines of FIG. 10. Subsequently, the second upper and lower cutters 3 move toward each other to thrust the points of the second cutters 3 into the sheath at one end of the intermediate strip region 1S.

With the points of the second cutters 3 remaining stuck in the sheath, the electric wire transfer means transfers the wire 1 longitudinally in the direction of the arrow P. Accordingly, the second cutters 3 relatively move to the other end of the intermediate strip region 1S, as shown by the solid lines of FIG. 10. With the movement, the sheath in the intermediate strip region 1S is formed with two split slits 5, upper and lower, from one end to the other end thereof (shown by hatching in FIGS. 10 and 11).

As shown in FIG. 11, the electric wire transfer means transfers the wire 1 back to the position of the first cutters 2. The first cutters 2 form another slit 4 along the outer periphery in the sheath at the other end of the intermediate strip region 1S.

After the formation of the slits 4 and the split slits 5 in this manner, the sheath in the intermediate strip region is stripped off in the following sheath stripping process:

With the first cutters 2 remaining stuck in the slit 4 formed at the other end, the electric wire transfer means transfers the wire 1 longitudinally in the direction of the arrow Q. The slit 4 at the other end of the intermediate strip region 1S is engaged with the first cutters 2. When the wire 1 is moved in the Q direction, the sheath in the intermediate strip region (or waste strip 7) is split along the split slits 5 and stripped from a core wire 6.

The sheath has been conventionally removed from the wire in the intermediate region in the above-mentioned method.

The conventional method, however, has problems described below.

Since the cutting depth of the second cutters 3 into the sheath of the wire 1 is slight, the abutment of the second cutters 3 against the sheath causes the elastic compression deformation of the sheath, as shown in FIG. 13. In some cases, the elastic compression deformation of the sheath prevents the second cutters 3 from cutting into the sheath. When the wire 1 is transferred with such insufficient cutting, the split slits 5 cannot be achieved which are formed by securely splitting the sheath from one end of the intermediate strip region 1S to the other end thereof. Some non-split portions are generated in the split slits 5 in the next process for stripping, and there arises a problem that the sheath in the intermediate strip region cannot be stripped.

In the sheath stripping process of the conventional method, when the wire 1 is transferred from the position shown in FIG. 11 in the Q direction, the waste strip 7 is split along the split slits 5 to be bent temporarily. At this time, an elastic restoring force is generated in the waste strip 7 against the pushing force of the first cutters 2. The problem is that the elastic restoring force causes the tip of the waste strip 7 to proceed between the cutters 2 and the core wire 6. In this state, satisfactory sheath stripping in the intermediate strip region cannot be expected. As shown in FIG. 14, for example, when the tip of the waste strip 7 proceeds between the upper cutter 2 and the core wire 6, the wire 1 is pushed relatively downward, whereby the core wire 6 is damaged by the lower cutter 2 or is cut off in some cases.

SUMMARY OF THE INVENTION

A first object of the present invention is to provide a method of removing sheath from an electric wire in an intermediate region, which reliably forms a split slit or longitudinal slit such that a sheath strip in an intermediate region can be consistently removed.

A second object of the present invention is to provide a method of removing sheath from an electric wire in an intermediate region, in which the sheath stripping process does not damage or sever the core wire.

According to the present invention, to achieve the first object, a method of removing sheath from an electric wire in an intermediate region for cutting into sheath of an electric wire at both ends of a predetermined intermediate region transversely of the electric wire by a first cutter, forming sheath in the intermediate region with a split slit extending longitudinally of the electric wire by a second cutter, and stripping the sheath in the intermediate region, comprises the steps of: moving the electric wire longitudinally in one direction while the first cutter remains stuck in the sheath at an end of the intermediate region on the side of the one direction to thereby separate the sheath in the intermediate region from sheath in an adjacent region; and moving the electric wire longitudinally in the one direction while a point of the second cutter is disposed within a gap generated by the separating step between the sheath in the intermediate region and the sheath in the adjacent region to thereby form the sheath in the intermediate region with the split slit.

This provides the formation of the gap between the sheath in the intermediate region and the sheath in the adjacent region on the side of one end of the intermediate region. While the second cutter is disposed within the gap, the electric wire is moved longitudinally, so that the split slit is formed. The second cutter can be accurately set to the sheath at a cutting position with a predetermined depth. Therefore, the sheath in the predetermined intermediate region can be formed with the split slit accurately and split from the wire securely.

According to the present invention, to achieve the second object, a method of removing sheath from an electric wire in an intermediate region for cutting into sheath of an electric wire at both ends of a predetermined intermediate region transversely of the electric wire by a first cutter, forming sheath in the intermediate region with a split slit extending longitudinally of the electric wire by a second cutter, and stripping the sheath in the intermediate region, comprises the steps of: forming a first slit by the first cutter at a position a predetermined distance deviated longitudinally in one direction from an end of an intermediate strip region of the electric wire on the side of the one direction; forming by the second cutter a split slit extending longitudinally of the electric wire from the first slit in the sheath of the electric wire to a position a predetermined distance deviated in the one direction from an end of the intermediate strip region on the side of the other direction; forming a second slit by the first cutter at the position the predetermined distance deviated in the one direction from the end of the intermediate strip region on the side of the other direction; and moving the electric wire in the other direction while the first cutter remains stuck in the sheath at the end of the intermediate strip region of the electric wire on the side of the other direction, after the termination of the foregoing steps, to thereby strip the sheath between the first slit and the second slit.

This provides the production of a sheath piece having no split slit in the intermediate strip region on the side of the other direction. Since the wire is moved longitudinally while the sheath piece is held between the first cutter and waste strip, the waste strip is prevented from proceeding between the first cutter and a core wire, in the process of stripping the waste strip. As a result, the first cutter is prevented from damaging or cutting off the core wire in the sheath stripping process.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
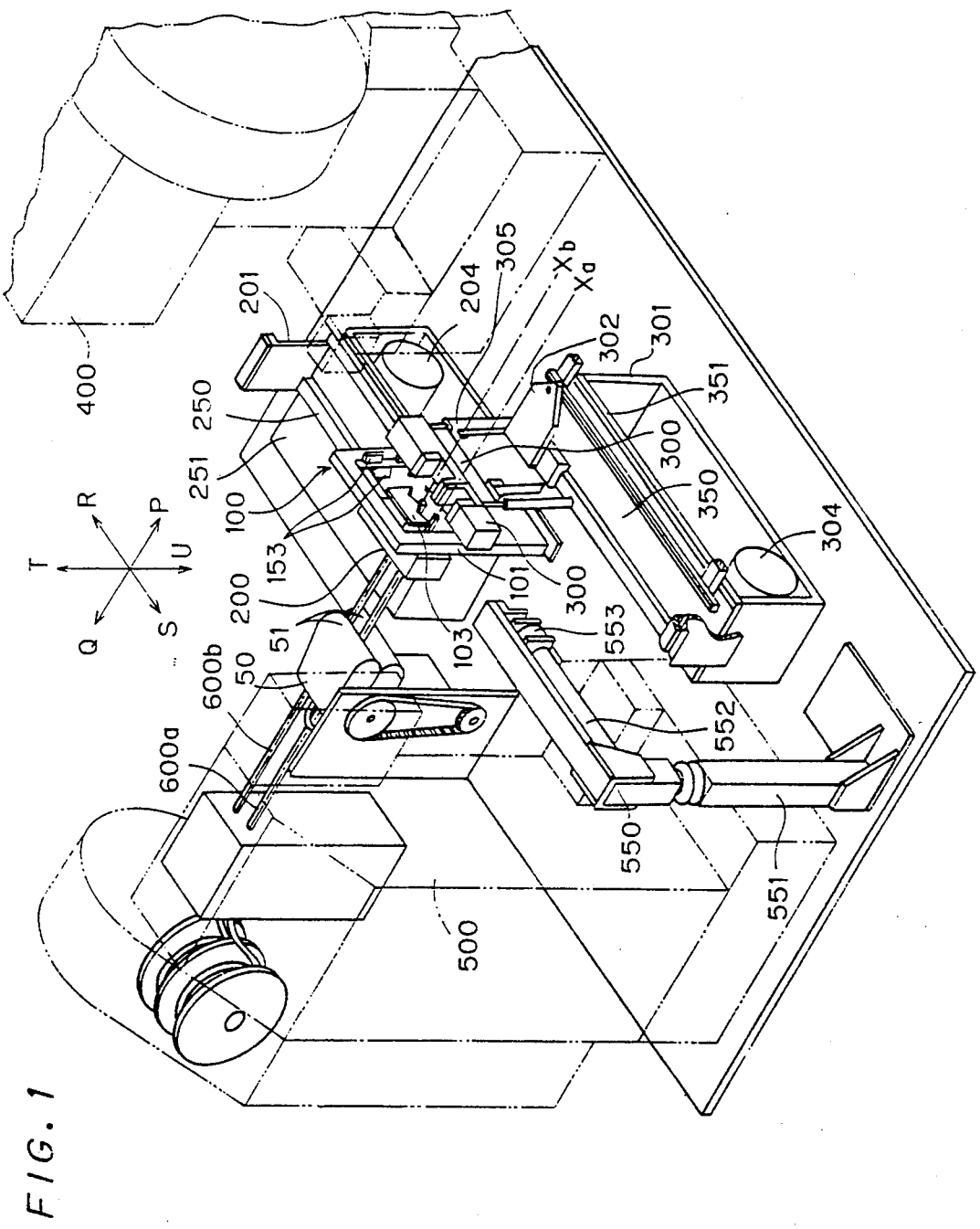
FIG. 1 is a perspective view of a harness production device for performing therein a sheath removing method according to a preferred embodiment of the present invention.

A harness production device shown in FIGS. 1 to 4 comprises electric wire feed means 50, a cutter unit 100, first and second clamp means 250 and 350, first and second terminal crimp means 400 and 500, and discharge means 550. The device can produce two harnesses at a time in serial order, each of which includes terminals 602 connected to both ends thereof by crimping and a core wire 603 exposed by the removal of sheath in an intermediate strip region, as shown in FIG. 5.

Figure 2:
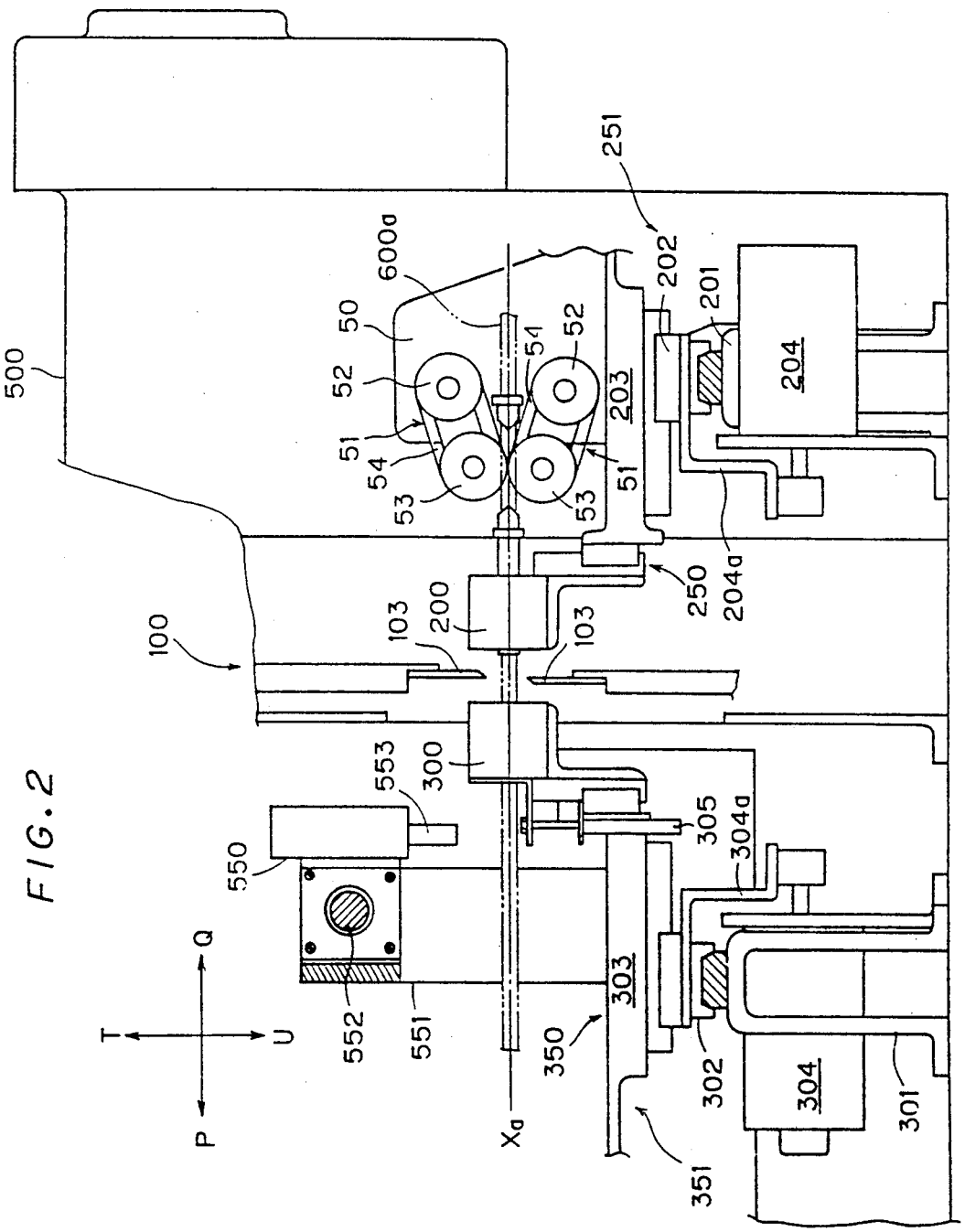
FIG. 2 is a side view of the harness production device of FIG. 1.

As particularly clearly illustrated in FIG. 2, the electric wire feed means 50 is provided with a pair of upper and lower carrier portions 51 on opposite sides of electric wire feed lines Xa and Xb. Each of the carrier portions 51 includes a length measuring roller 52 rotatably supported at one end thereof and a feed roller 53 rotatably supported at the other end thereof. A feed belt 54 is stretched between the length measuring roller 52 and the feed roller 53. Each of the carrier portions 51 is provided pivotally on the axis of rotation of the length measuring roller 52. Both of the carrier portions 51 are pivoted on the axes of rotation of the length measuring rollers 52, thereby two electric wires 600a and 600b are held between the feed rollers 53. When an electric wire feed motor 60 (in FIG. 3) is driven in this holding state, the feed rollers 53 are rotated in the directions reverse to each other, so that both of the electric wires 600a and 600b are fed simultaneously along the electric wire feed lines Xa and Xb in the direction of the arrow P. The electric wire feed means 50 thus feeds the electric wires 600a and 600b intermittently.

The first and second clamp means 250 and 350 comprise first and second clamps 200 and 300 capable of clamping and releasing the electric wires 600a and 600b, and first and second clamp transfer means 251 and 351 for three-dimensionally movably supporting the first and second clamps 200 and 300, respectively. The first and second clamp transfer means 251 and 351 include leftward/rightward transfer portions 202 and 302 supported by bases 201 and 301 movably rightward and leftward, i.e., in the directions shown by the arrows R and S. The leftward/rightward transfer portions 202 and 302 support backward/forward transfer portions 203 and 303 movably forward and backward, i.e., in the directions shown by the arrows P and Q. The backward/forward transfer portions 203 and 303 support the first and second clamps 200 and 300 movably upward and downward, i.e., in the directions shown by the arrows T and U. The leftward/rightward transfer portions 202 and 302 are laterally transferred by the drive of motors 204 and 304 mounted to the bases 201 and 301. Power transmission mechanisms 204a and 304a are provided between the motors 204, 304 and the leftward/rightward transfer portions 202, 302, respectively. The backward/forward transfer portions 203 and 303 are transferred back and forth by the drive of motors not shown. The second clamp 300 is vertically transferred by the drive of a cylinder 305 disposed between the clamp 300 and the backward/forward transfer portion 303.

Figure 4:
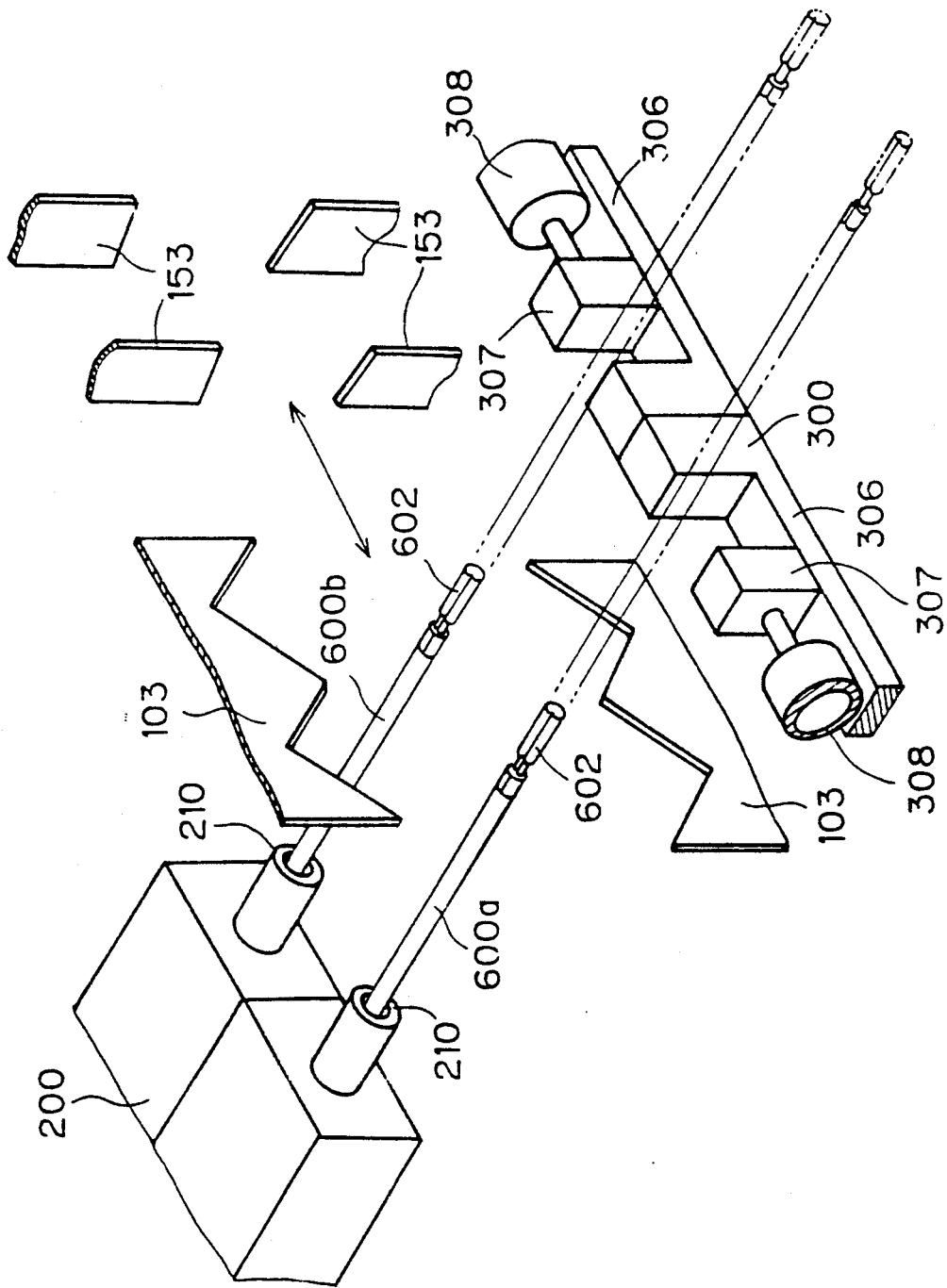
FIG. 4 is a partially enlarged perspective view of the harness production device of FIG. 1.
Figure 5:
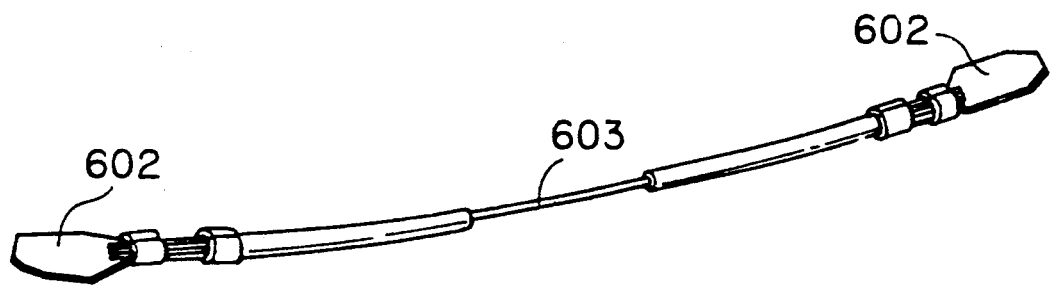
FIG. 5 is a perspective view of a harness which is produced by the harness production device in the preferred embodiment.

As shown in FIG. 4, the first clamp 200 is formed with electric wire through holes 210 through which the electric wires 600a and 600b fed along the electric wire feed lines Xa and Xb can pass, respectively. The first clamp 200 is adapted to clamp and release the electric wires 600a and 600b passing through the through holes 210.

The second clamp 300 for clamping both of the electric wires 600a and 600b includes fixed portions 306, mobile portions 307, and cylinders 308. The substantially L-shaped fixed portions 306 are disposed opposite to each other. The mobile portions 307 are mounted on the horizontal parts of the fixed portions 306 movably in both directions crosswise to the electric wire feed lines Xa and Xb. The cylinders 308 drive the advance and retreat of the mobile portions 307. The cylinders 308 are driven while the electric wires 600a and 600b are disposed between the vertical parts of the fixed portions 306 and the mobile portions 307, and thereby the electric wires 600a and 600b are clamped by the fixed portions 306 and the mobile portions 307, respectively. When the mobile portions 307 are retreated, the clamping of the electric wires 600a and 600b is released.

Figure 6:
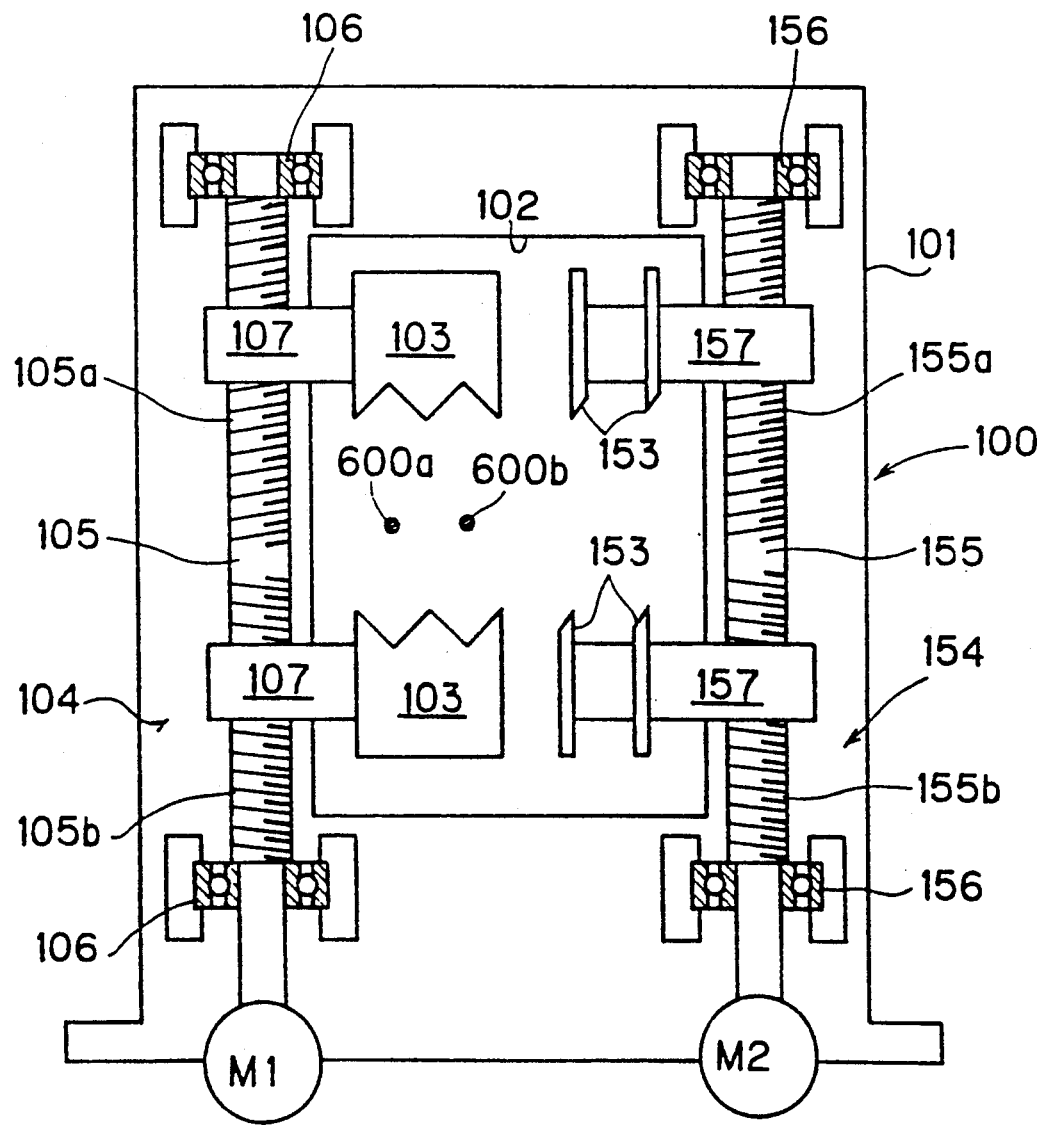
FIG. 6 is a front view of a major part of the harness production device.

FIG. 6 is a front view of the cutter unit 100. The cutter unit 100 comprises a cutter base 101 formed in the center thereof with an opening 102 for passage of the wires therethrough; a pair of first cutters 103 vertically disposed above and below the electric wire feed lines Xa and Xb; a first drive portion 104 for driving the movement of the first cutters 103; a pair of second cutters 153 vertically disposed in juxtapositional relation to the first cutters 103; and a second drive portion 154 for driving the movement of the second cutters 153.

The first drive portion 104 is provided with a ball screw 105. The ball screw 105 includes a right-handed screw region 105a in the upper part thereof in which the outer periphery is threaded right-handedly, and a left-handed screw region 105b in the lower part thereof in which the outer periphery is threaded left-handedly. The ball screw 105 is disposed such that the axial direction thereof is vertical, while both upper and lower ends of the ball screw 105 are rotatably supported by the cutter base 101 through bearings 106. A rotation drive shaft of a servo-motor M1 is coupled to the lower end of the ball screw 105. The torque of the rotation drive shaft of the servo-motor M1 is transmitted to the ball screw 105. Each of the first cutters 103 is attached to a bracket 107. The brackets 107 are in threaded engagement with the right- and left-handed screw regions 105a and 105b of the ball screw 105, with the rotation thereof on the vertical axis being restricted. When the ball screw 105 is rotated, the brackets 107 are driven toward and away from each other in the axial directions of the ball screw 105 in response to the directions of rotation of the ball screw 105. In accordance with the drive, the first upper and lower cutters 103 are moved toward and away from each other.

The structure of the second cutters 153 and others is substantially similar to that of the first cutters 103 and others. A ball screw 155 is rotatably supported by the cutter base 101 through bearings 156. Two second cutters 153 are attached to each bracket 157. The brackets 157 are in threaded engagement with right- and left-handed screw regions 155a and 155b of the ball screw 155, with the rotation of the brackets 157 on the vertical axis being restricted. The brackets 157 are driven toward and away from each other by the drive of a servo-motor M2 in the same manner as the brackets 107. In accordance with the drive, the second upper and lower cutters 153 are moved toward and away from each other.

Figure 3:
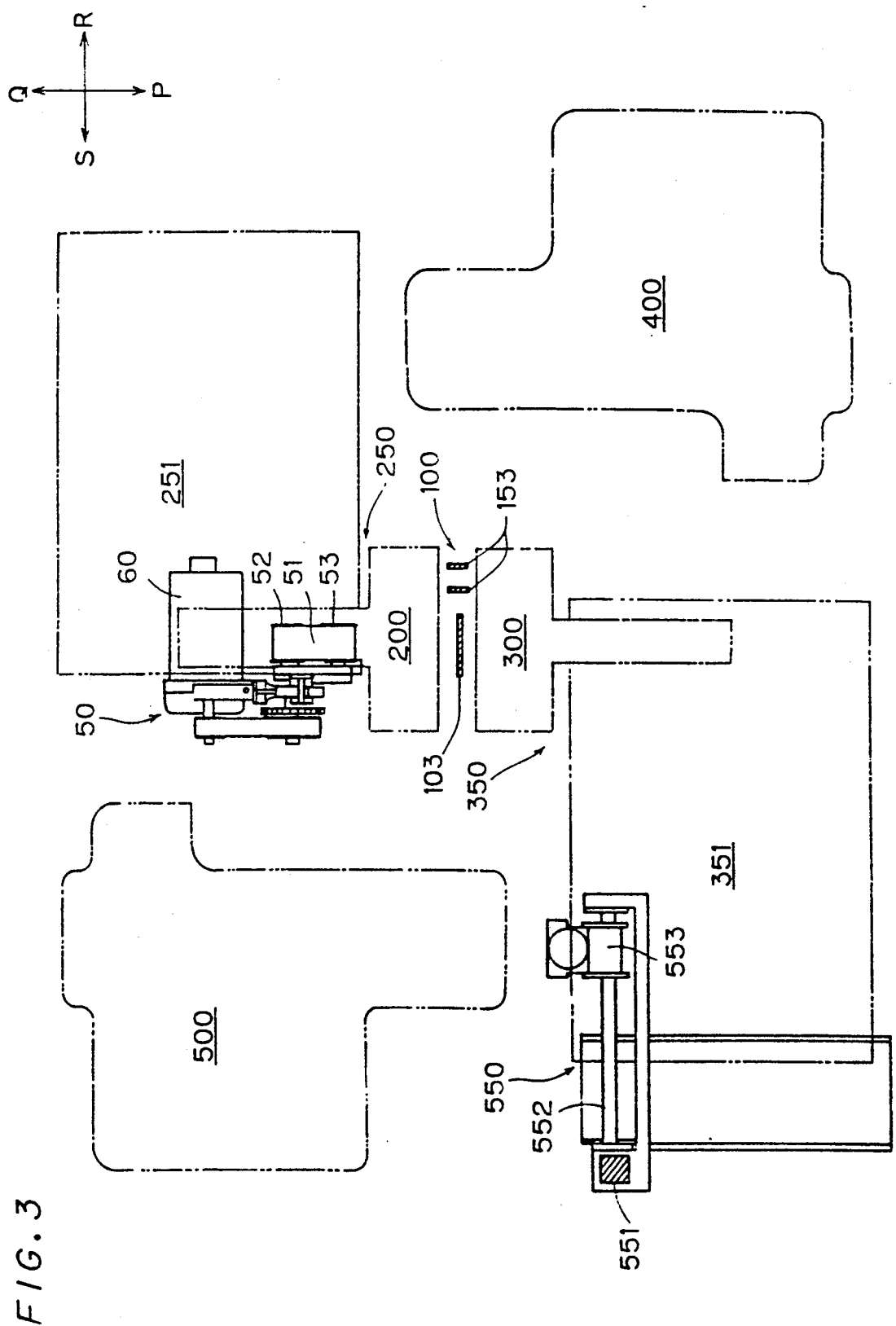
FIG. 3 is a plan view of the harness production device of FIG. 1.

With reference to FIGS. 1 to 3, the discharge means 550 comprises a support 551, a rail 552 fixed at the top end of the support 551 and disposed laterally, i.e., in the directions shown by the arrows R and S, and a discharge clamp 553 movably supported by the rail 552 longitudinally of the rail 552. The drive of drive means not shown causes the discharge clamp 553 to move laterally along the rail 552. The discharge clamp 553 can clamp and release two cut-off wires described later at a time.

Figure 7A:
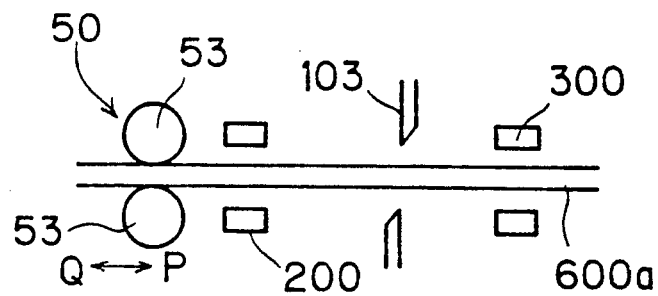
FIGS. 7A to 7S are side views of a major part of the harness production device for illustrating respective steps of a method of removing sheath from an electric wire in an intermediate region according to the present invention.

Hereinafter described is a method of removing sheath from an electric wire in an intermediate region by means of the above-mentioned harness production device according to a preferred embodiment of the present invention, based on the illustration of FIGS. 7A to 7S. Output signals from control means not shown work the respective drive portions, whereby the harness production device is operated as described hereinafter. FIGS. 7A to 7S illustrate only one electric wire 600a. The same is true for the other electric wire 600b.

The initial state of the harness production device before the operation is as follows: The first and second clamps 200 and 300 are disposed on the electric wire feed lines Xa and Xb, respectively, while releasing the electric wires 600a and 600b. The first upper and lower cutters 103 are widely spaced apart from each other. The second upper and lower cutters 153 are widely spaced apart from each other. The discharge clamp 553 of the discharge means 550 remains in a released or unclamped condition with respect to the electric wires at the right end position of the R direction of FIG. 1.

Referring to FIG. 7A, the feed rollers 53 of the electric wire feed means 50 are rotated while holding the electric wires 600a and 600b therebetween. Accordingly, the wires 600a and 600b are fed by a predetermined distance along the electric wire feed lines Xa and Xb in the direction of the arrow P.

Figure 7B:
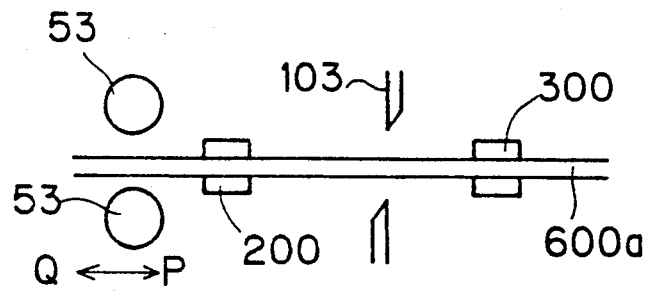
Figure 7C:
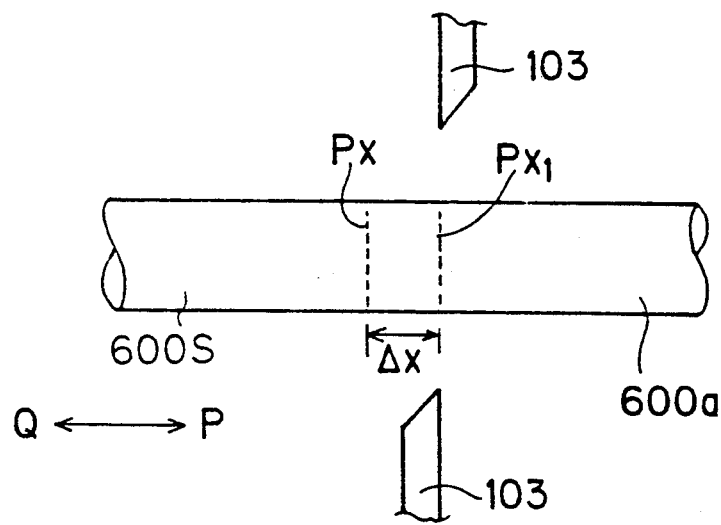

As shown in FIG. 7B, the feed rollers 53 release the hold of the wires 600a and 600b, while the first and second clamps 200 and 300 clamp the wires 600a and 600b. The points of the first cutters 103 correspond to a position $Px_1$, as shown in FIG. 7C. The position $Px_1$ is spaced a predetermined distance $\Delta x$ apart in the P direction from an end position Px of an intermediate strip region 600S in each of the wires 600a and 600b. The end position Px is the downstream end position of the intermediate strip region 600S with respect to the electric wire feed direction P.

Figure 7D:
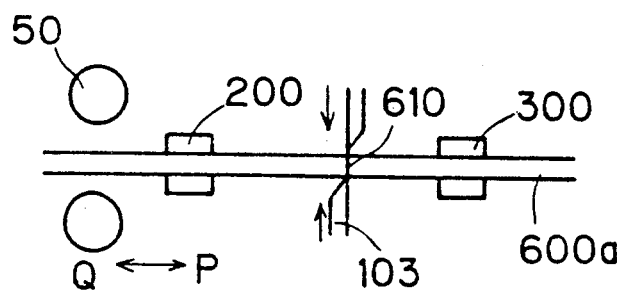

The first cutters 103 cut into the wires 600a and 600b from above and below the same, as shown in FIG.7D, thereby a first slit 610 is formed at the position $Px_1$.

Figure 7E:
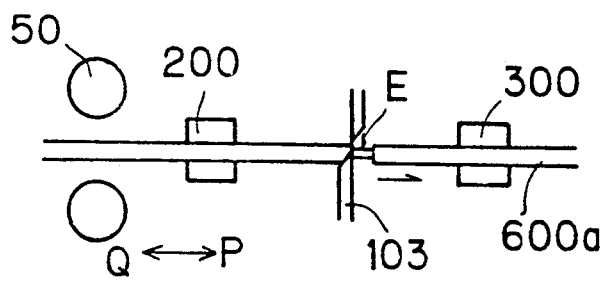

With the first cutters 103 remaining stuck in the wires, the first and second clamps 200 and 300 move a slight distance in the P direction, as shown in FIG. 7E. As a result, the sheath upstream of the first slit 610 is compressed while departing from the sheath downstream thereof, so that a gap E is formed between the upstream and downstream sheaths.

Figure 7F:
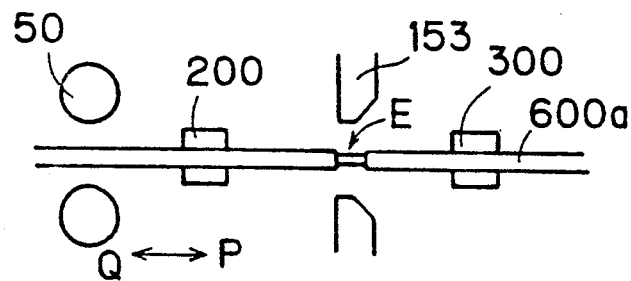

After the first cutters 103 vertically move apart from each other, the first and second clamps 200 and 300 move rightward, i.e., in the R direction (see FIGS. 1 to 3), as illustrated in FIG. 7F. The wires 600a and 600b are transferred and disposed such that the points of the second cutters 153 correspond to the gap E.

Figure 7G:
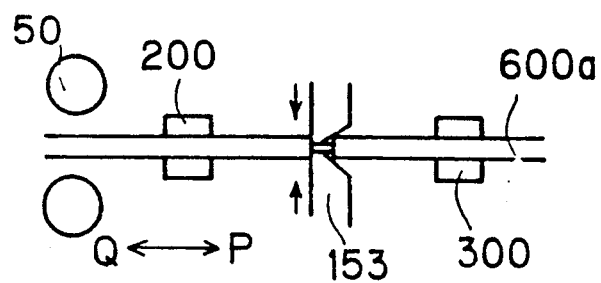
Figure 7H:
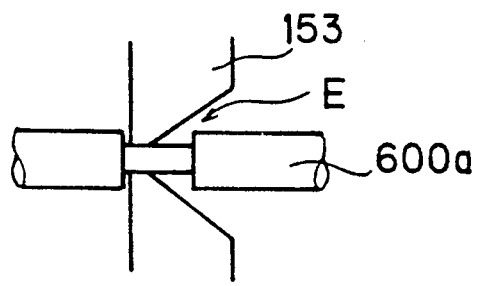

Referring to FIGS. 7G and 7H, the second upper and lower cutters 153 move toward each other to insert the points thereof within the gap E.

Figure 7I:
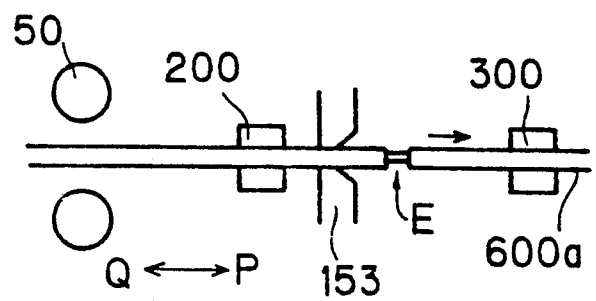
Figure 7J:
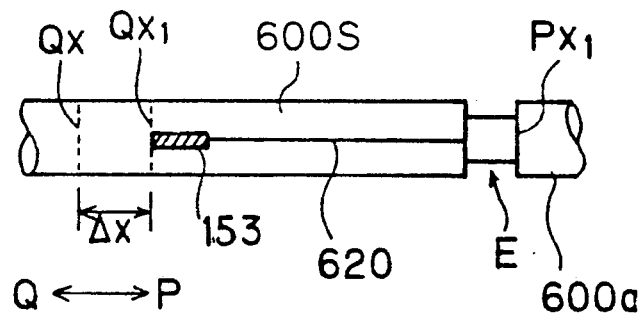

In this state, the first and second clamps 200 and 300 advance in the P direction, as shown in FIG. 7I. This provides the formation of two split slits 620, upper end lower, from the vicinity of the position $Px_1$ to a position $Qx_1$, as shown in FIG. 7J. The position $Qx_1$ is spaced the predetermined distance $\Delta x$ apart in the P direction from an upstream end position Qx of the intermediate strip region 600S.

In this method, the points of the second cutters 153 are disposed to the position corresponding to the gap E after the formation of the gap E, and subsequently the second cutters 153 move toward each other and are disposed within the gap E. Therefore, no elastic deformation occurs which is caused by the points of the second cutters 153 pressing the sheath of the wires. The second cutters 153 are accurately set to the sheath at a cutting position with a predetermined depth. When the wires are advanced in the P direction, the sheath can be accurately formed with the split slits 620 from one end to the other end of a predetermined intermediate region spaced the predetermined distance $\Delta x$ apart from the intermediate strip region 600S. No cutting failure occurs.

Figure 7K:
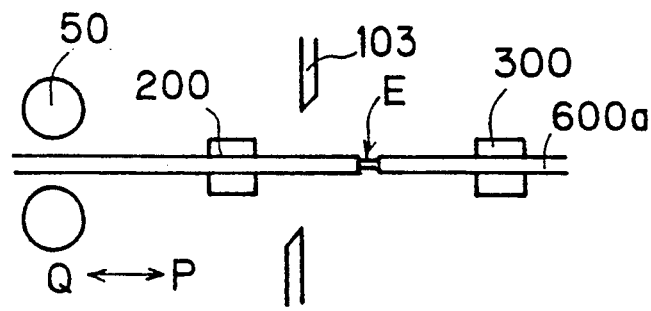
Figure 7L:
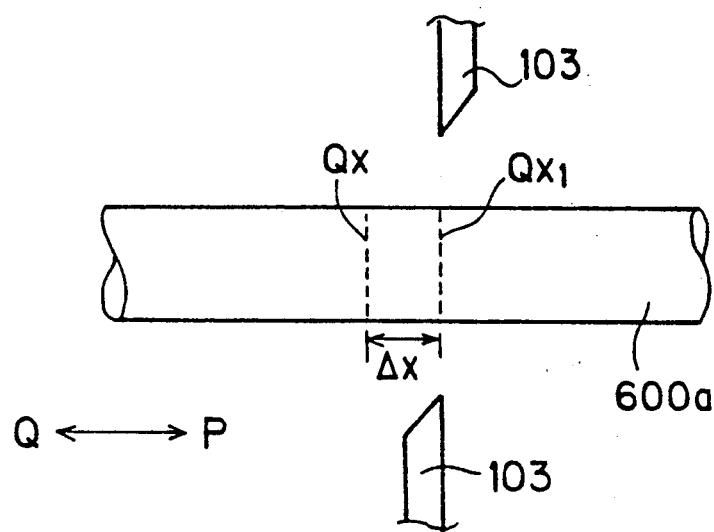

The second cutters 153 vertically depart from each other, and thereafter the first and second clamps 200 and 300 move leftward, i.e., in the S direction (see FIGS. 1 to 3), so that the wires 600a and 600b are disposed on the electric wire feed lines Xa and Xb respectively, as shown in FIG. 7K. This disposition is carried out such that the points of the first cutters 103 correspond to the position $Qx_1$ of the wires 600a and 600b, as shown in FIG. 7L.

Figure 7M:
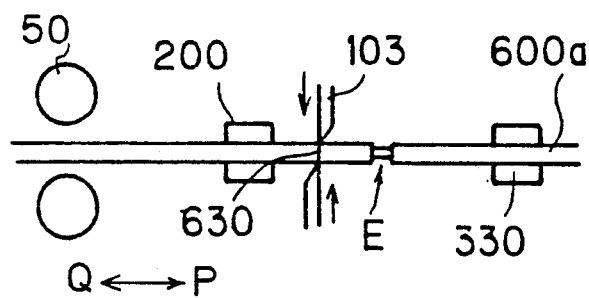

With reference to FIG. 7M, the first cutters 103 move toward each other to form a second slit 630 at the position $Qx_1$ of the electric wires 600a and 600b.

Figure 7N:
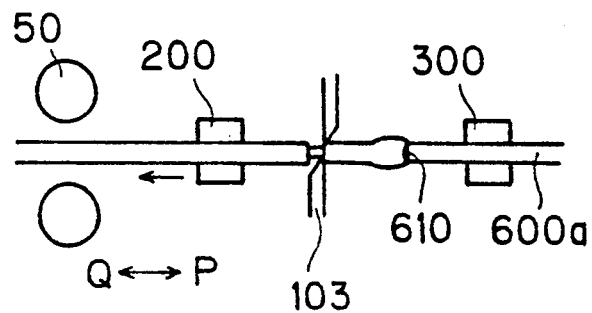

With the first cutters 103 remaining stuck in the wires at the position $Qx_1$, the first and second clamps 200 and 300 move a predetermined distance backward, i.e., in the Q direction (see FIGS. 1 to 3), as shown in FIG. 7N. Accordingly, the sheath downstream of the second slit 630 is separated from the sheath upstream thereof.

Figure 7O:
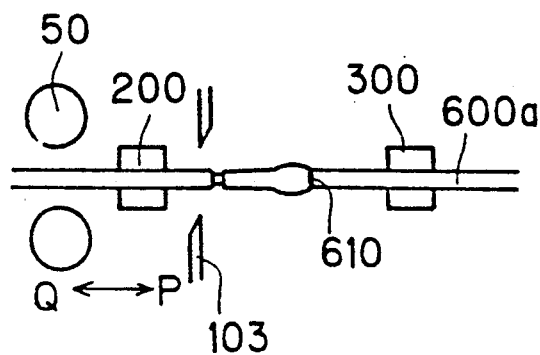
Figure 7P:
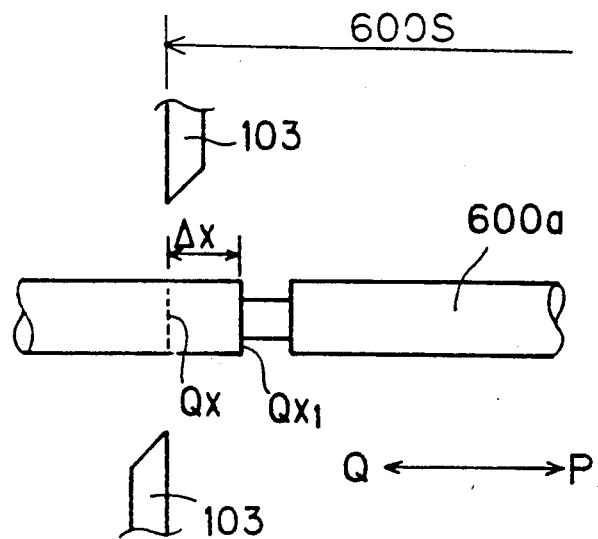

As illustrated in FIG. 7O, the first cutters 103 vertically depart from each other, and thereafter the first and second clamps 200 and 300 advance a predetermined distance in the P direction. The wires are transferred and disposed such that the points of the first cutters 103 correspond to the upstream end position Qx of the intermediate strip region 600S, as shown in FIG. 7P.

Figure 7Q:
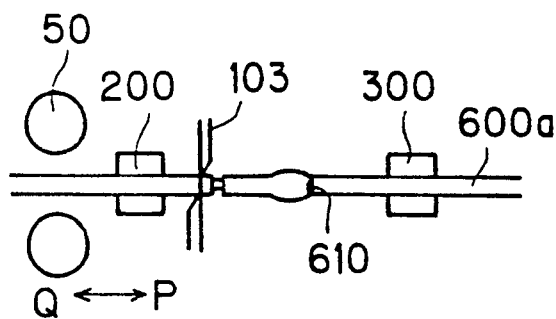

Referring to FIG. 7Q, the first cutters 103 move toward each other to cut into the sheath of the wires 600a and 600b at the position Qx.

Figure 7R:
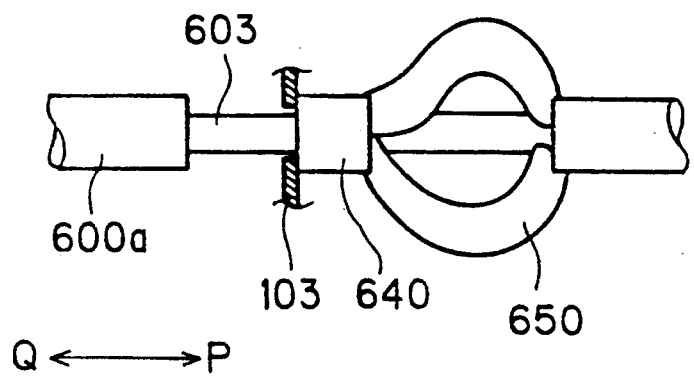
Figure 7S:
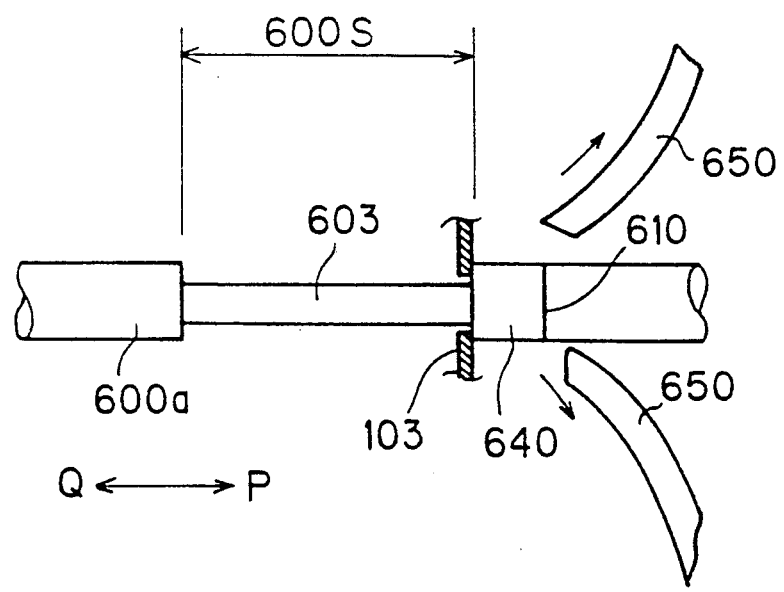

In this state, the first and second clamps 200 and 300 move in the Q direction. Accordingly, a sheath piece 640 located between the positions Qx and $Qx_1$, while being pushed by the first cutters 103, is relatively transferred along the core wire 603 in the P direction, as shown in FIG. 7R. As a result, waste strip 650 formed with the split slits 620 is squeezed by the sheath piece 640 in the P direction. Since the downstream end of the waste strip 650 is engaged with the upstream end of the sheath downstream of the waste strip 650, the waste strip 650 is forced to split along the split slits 620 and bend temporarily by the squeeze. At this time, an elastic restoring force against the squeezing force of the sheath piece 640 is generated in the waste strip 650. By the restoring force, the sheath piece 640 is subjected to a force in the direction to push back toward the first cutters 103. However, the sheath piece 640 is cylindrical, and the force exerted on the first cutters 103 from the sheath piece 640 is in the Q direction, i.e., perpendicular to the direction in which the first cutters 103 move toward and away from each other. The restoring force does not cause the end of the sheath piece 640 to proceed between the first cutters 103 and the core wire 603. The end of the waste strip 650 does not proceed between the sheath piece 640 and the core wire 603. Therefore, in the step of stripping the waste strip 650, the core wire 603 does not deviate relatively vertically. The first cutters 103 are prevented from damaging or cutting off the core wire 603.

When the first cutters 103 squeeze the sheath piece 640 up to the first slit 610 (or the position $Px_1$), as shown in FIG. 7S, the waste strip 650 falls off the core wire 603. With the falling-off of the waste strip 650, the sheath piece 640 of $\Delta x$ in length is transferred to the side of the first slit 610. The core wire 603 can be thus exposed accurately in the intermediate strip regions 600S of the electric wires 600a and 600b.

After the removal of the sheath from the electric wires in the intermediate strip region 600S in the above-mentioned manner, a wire end cut process and a terminal crimp process are performed in order on the electric wires 600a and 600b. The processes are described hereinafter.

After the step shown in FIG. 7S, the first and second clamps 200 and 300 release the electric wires 600a and 600b, while the feed rollers 53 hold the wires 600a and 600b therebetween. The electric wire feed means 50 is driven, and thereby the wires are fed along the electric wire feed lines Xa and Xb in the P direction.

The first and second clamps 200 and 300 clamp the electric wires 600a and 600b again, while the feed rollers 53 release the wires 600a and 600b. The first cutters 103 cut off the electric wires 600a and 600b at a predetermined position. This terminates the wire end cut process.

The first clamp 200 moves a slight distance in the P direction. The first cutters 103 cut into the sheath along the periphery in the downstream end portions of the wires 600a and 600b clamped by the first clamp 200 (hereinafter referred to as "residual wires"). In this state, the first clamp 200 moves in the Q direction, whereby the sheath is removed in the downstream end portions of two residual wires 600a and 600b. The first clamp 200 moves rightward, i.e., in the R direction (see FIGS. 1 to 3) to the position corresponding to the first terminal crimp means 400. The first terminal crimp means 400 connects terminals 602 by crimping to the non-coated downstream end portions of two residual wires 600a and 600b.

The first clamp 200 moves leftward, i.e., in the S direction (see FIGS. 1 to 3) and returns to the original position illustrated in FIG. 1.

While the crimp-connection process of the terminals 602 is performed on the non-coated downstream end portions of the residual wires 600a and 600b, the sheath is removed in the upstream end portions of the wires 600a and 600b clamped by the second clamp 300 (hereinafter referred to as "cut-off wires"). The second clamp 300 moves leftward, i.e., in the S direction to the position corresponding to the second terminal crimp means 500. The second terminal crimp means 500 connects terminals by crimping to the non-coated upstream end portions of two cut-off wires 600a and 600b.

Both of the cut-off wires 600a and 600b are clamped by the discharge clamp 553 and released by the second clamp 300, so that the cut-off wires 600a and 600b are delivered from the second clamp 300 to the discharge clamp 553. The discharge clamp 553 moves leftward, i.e., in the S direction along the rail 552. The discharge clamp 553 thereafter releases the cut-off wires 600a and 600b. The cut-off wires 600a and 600b are discharged to an electric wire discharge unit not shown.

The second clamp 300 which has handed over the cut-off wires 600a and 600b to the discharge clamp 553 is transferred rightward, i.e., in the R direction and returns to the position of the initial state.

Such an operation is successively repeated. Every time the operation is carried out, two harnesses (in FIG. 5) are produced in serial order, each of which includes the non-coated intermediate strip region and the terminals 602 connected by crimping to both ends.

When a harness is produced in the above-mentioned method, the sheath piece 640 is held by the core wire 603 isolatedly from an adjacent sheath 645. In the next step, the end of another harness is connected by crimping to the core wire 603 of the aforesaid harness, and tapes or the like are wound around the vicinity of the connection part. Since the region adjacent to the sheath piece 640 is wound with tape at this time, the isolation of the sheath piece 640 is not a problem.

In the above-mentioned preferred embodiment, the waste strip 650 can be bent and removed from the core wire, as shown in FIG. 7R, because the downstream end of the sheath (or the waste strip 650) squeezed through the sheath piece 640 is engaged with the upstream end of the sheath 600a downstream of the waste strip 650. However, the downstream end of the squeezed waste strip 650 may strike on the downstream sheath, depending on the type of wire and the material and thickness of sheath. Hereinafter discussed is the method of removing sheath from a wire in an intermediate region according to another preferred embodiment of the present invention for solving such a problem. The steps of FIGS. 7A to 7M according to the above-mentioned preferred embodiment are executed substantially similarly, in this preferred embodiment. In this preferred embodiment, the first and second slits 610 and 630 are formed, in the steps of FIGS. 7C to 7L, at the downstream and upstream end positions Px and Qx of the intermediate strip region in place of the positions $Px_1$ and $Qx_1$, respectively. The step of FIG. 7N and the succeeding steps are replaced with the steps of FIGS. 8A to 8F described later.

Figure 8A:
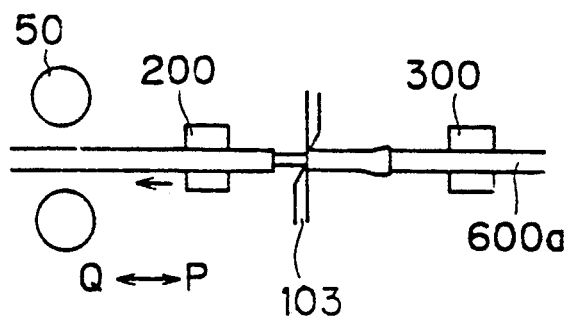
FIGS. 8A to 8F are side views of a major part of the harness production device for illustrating respective steps of another method of removing sheath from an electric wire in an intermediate region according to the present invention.
Figure 8B:
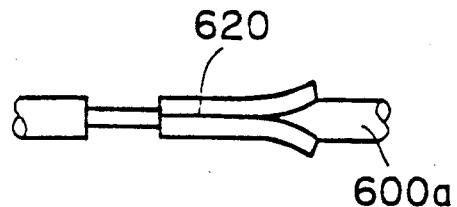

Similarly to the operation of FIG. 7M, the first cutters 103 cut into the sheath to form the second slit 630. In this state, the first and second clamps 200 and 300 move a predetermined distance backward, i.e., in the Q direction, as shown in FIG. 8A. Accordingly, the upstream end of the sheath in the intermediate strip region is relatively pushed downstream in engagement with the first cutters 103. As a result, the sheath in the intermediate strip region deviates downstream so that the sheath in the downstream end portion of the intermediate strip region slightly overlaps the sheath downstream of the intermediate strip region, as shown in the plan view of FIG. 8B.

Figure 8C:
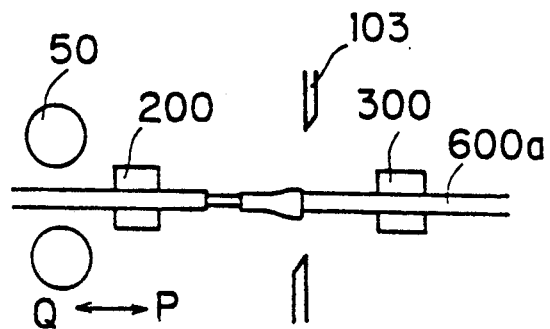

After the first cutters 103 vertically depart from each other, the first and second clamps 200 and 300 retreat in the Q direction, as shown in FIG. 8C. The retreat is carried out such that the points of the first cutters 103 correspond to the downstream end of the deviated sheath in the intermediate strip region.

Figure 8D:
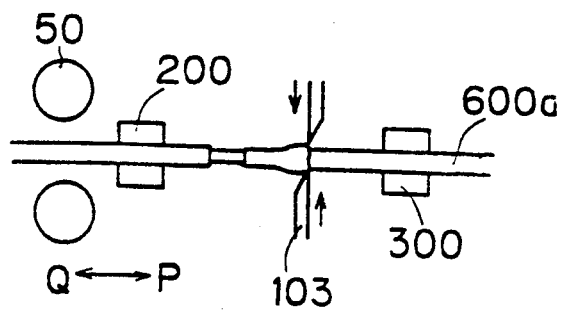
Figure 8E:
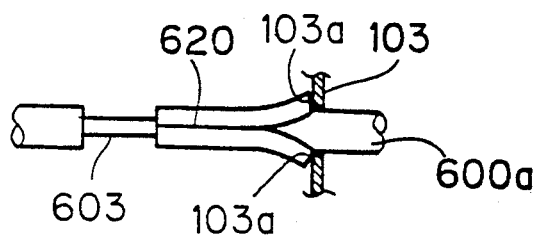
Figure 8F:
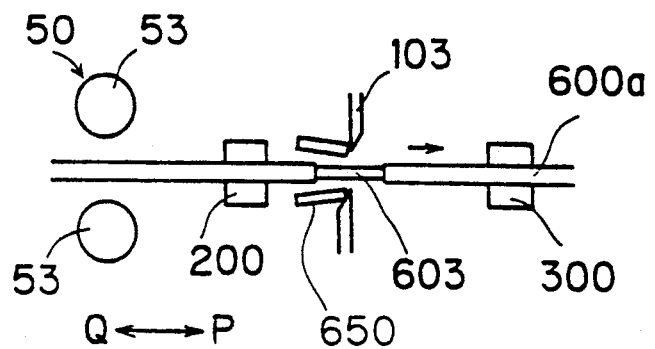
Figure 9:
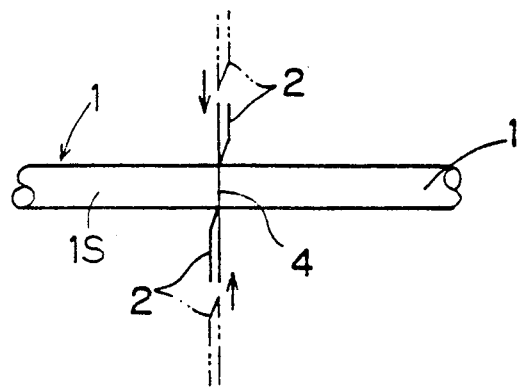
FIGS. 9 to 12 are side views of a major part of a sheath stripping device for illustrating respective steps of a conventional method of removing sheath from an electric wire in an intermediate region.
Figure 10:
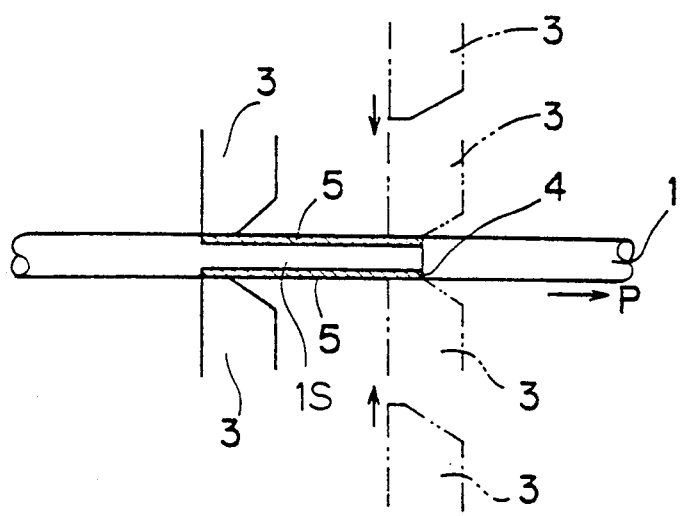
Figure 11:
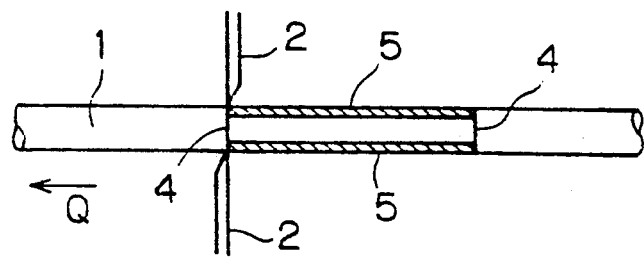
Figure 12:
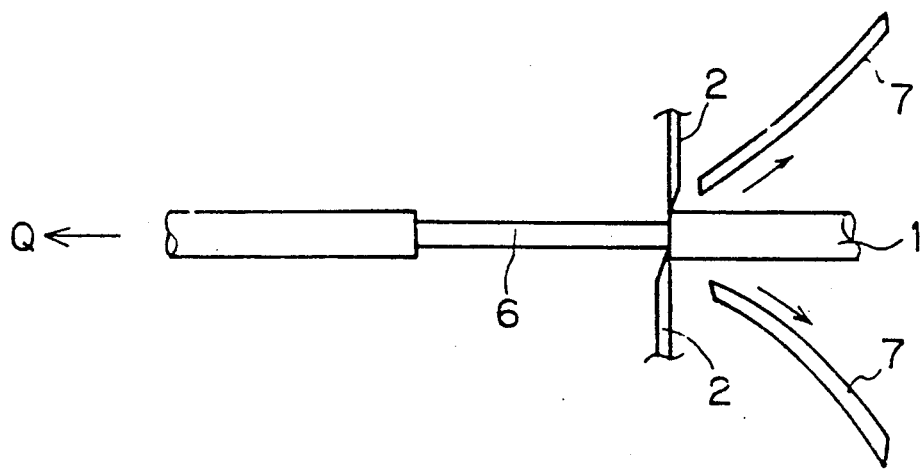
Figure 13:
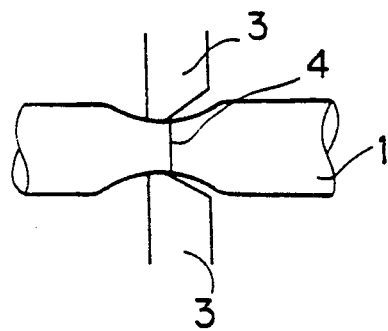
FIG. 13 illustrates a problem in the conventional method.
Figure 14:
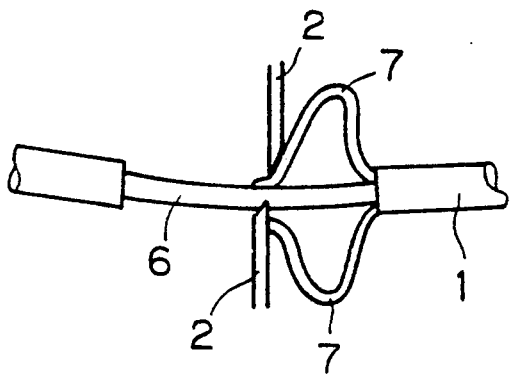
FIG. 14 illustrates another problem in the conventional method.

With reference to FIG. 8D, the first cutters 103 move toward each other to the extent that they do not cut into the wire 600a. V-shaped inner peripheral edges 103a of the first cutters 103 are disposed opposite to the downstream end of the sheath in the intermediate strip region, as shown in the plan view of FIG. 8E. Referring to FIG. 8F, the first and second clamps 200 and 300 advance in the P direction. Accordingly, the downstream end of the sheath in the intermediate strip region is squeezed upstream in engagement with the first cutters 103. As a result, the sheath in the intermediate strip region (or the waste strip 650) is stripped from the core wire 603.

In the process of removing the sheath in the intermediate strip region from the electric wires 600a and 600b as shown in FIGS. 8A to 8F, the sheath in the intermediate strip region is forced to deviate once downstream by the first cutters 103, to thereby be separated from the core wire 603. When the first cutters 103 subsequently transfer the sheath in the intermediate strip region upstream, the sheath is securely stripped from the core wire 603.

The succeeding processes, that is, the wire end cut process and the terminal crimp process according to this preferred embodiment are similar to those of the previous preferred embodiment.

In the respective preferred embodiments, the method of the present invention is performed in the harness production device for making harnesses having crimp-style terminals on both ends thereof. The present invention is not limited to this, and is applicable to a device for merely stripping sheath from a wire in the intermediate strip region.

While the invention has been shown and described in detail, the foregoing description is in all aspects illustrative and not restrictive. It is therefore understood that numerous modifications and variations can be devised without departing from the scope of the invention.

What is claimed is:

1. A method for removing sheath from an electric wire in an intermediate region, comprising the steps of:
    forming a first slit near an end of said intermediate region by a first cutter, said first slit at least partially extending about a circumference of said sheath;
    separating said sheath of said intermediate region from neighboring sheath portions at said first slit such that a gap is formed between said intermediate region and neighboring sheath at said first slit;
    inserting a second cutter into said gap;
    providing relative movement between said electric wire and said cutter such that a longitudinal slit is formed by said second cutter; and
    removing said sheath of said intermediate region.

2. The method of claim 1, wherein the step of removing said sheath includes:
    sliding said electric wire in a longitudinal direction with said first cutter engaged with said sheath of said intermediate region such that at least a portion of said sheath of said intermediate region is separated from a core wire; and sliding said electric wire in a longitudinal direction with said first cutter in contact with a surface of said sheath of said intermediate region which is separated from said core wire so that said sheath is removed.

3. A method for removing an intermediate region of sheath from an electric wire comprising the steps of:

forming a first slit at an end of said intermediate region by a first cutter, wherein said first slit at least partially extends about a circumference of said sheath;

forming a longitudinal slit by a second cutter, such that said longitudinal slit extends from said first slit;

forming a second slit by said first cutter at a second end of said intermediate region; and providing relative movement of said electric wire with respect to said first cutter with said first cutter engaged with said sheath outside of said intermediate region at a location spaced from said second end of said intermediate region such that said sheath between said first slit and said second slit is removed;

the method further including forming a third slit by said first cutter, said third slit at least partially extending about a circumference of the sheath, and wherein a sheath segment is defined between said second and third slits; and wherein in the step of providing relative movement with said first cutter engaged with said sheath, the first cutter is engaged with said sheath segment between said second and third slits.

4. The method of claim 3, further including moving said sheath segment with respect to said core wire until an end of said sheath segment formed by said second slit is adjacent a location of said first slit.

5. The method of claim 3, wherein the steps of forming said second and third slits includes forming said slits such that said sheath segment has a hollow cylindrical shape.

6. A method for removing an intermediate region of sheath from an electric wire comprising the steps of:

forming a first slit at an end of said intermediate region by a first cutter, wherein said first slit at least partially extends about a circumference of said sheath;

forming a longitudinal slit by a second cutter such that said longitudinal slit extends from said first slit;

forming a second slit by said first cutter at a second end of said intermediate region;

providing relative movement of said electric wire with respect to said first cutter with said first cutter engaged with said sheath such that said sheath between said first slit and said second slit is removed;

the method further including separating said sheath of said intermediate region from a neighboring sheath portion to form a gap therebetween, wherein the step of separating said sheath to form a gap is performed after formation of said first slit and prior to formation of said longitudinal slit; and wherein said step of forming a longitudinal slit includes inserting said second cutter into said gap and providing relative movement of said wire with respect to said second cutter thereby forming the longitudinal slit.

7. The method of claim 6, further including forming a third slit by said first cutter, said third cut at least partially extending about a circumference of the sheath, and wherein a sheath segment is defined between said second and third slits; and wherein in the step of providing relative movement with said first cutter engaged with said sheath, the first cutter is engaged with said sheath segment between said second and third slits.

* * * * *